United States Patent
Wang

(10) Patent No.: US 10,972,788 B1
(45) Date of Patent: Apr. 6, 2021

(54) DISTORTION-BASED VIDEO RE-ENCODING

(71) Applicant: Amazon Technologies, Inc., Seattle, WA (US)

(72) Inventor: Qia Wang, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 170 days.

(21) Appl. No.: 16/118,204

(22) Filed: Aug. 30, 2018

(51) Int. Cl.
| | |
|---|---|
| *H04N 9/87* | (2006.01) |
| *G11B 27/031* | (2006.01) |
| *G06K 9/00* | (2006.01) |
| *H04N 21/4402* | (2011.01) |
| *H04N 19/567* | (2014.01) |
| *H04N 21/2187* | (2011.01) |
| *H04N 19/159* | (2014.01) |

(52) U.S. Cl.
CPC . *H04N 21/440254* (2013.01); *G06K 9/00221* (2013.01); *H04N 19/159* (2014.11); *H04N 19/567* (2014.11); *H04N 21/2187* (2013.01)

(58) Field of Classification Search
CPC ......... H04N 21/440254; H04N 19/159; H04N 19/567; H04N 21/2187; G06K 9/00221
See application file for complete search history.

(56) References Cited

U.S. PATENT DOCUMENTS

| | | | | |
|---|---|---|---|---|
| 8,396,130 | B2* | 3/2013 | Shimizu | H04N 19/56 |
| | | | | 375/240.16 |
| 2002/0150247 | A1* | 10/2002 | Linnartz | H04N 19/40 |
| | | | | 380/205 |
| 2010/0020878 | A1* | 1/2010 | Liang | H04N 19/40 |
| | | | | 375/240.16 |
| 2015/0178953 | A1* | 6/2015 | Gao | G06T 7/70 |
| | | | | 345/681 |
| 2016/0227230 | A1* | 8/2016 | Lee | H04N 19/55 |
| 2017/0251261 | A1* | 8/2017 | James | H04N 21/4725 |
| 2018/0184154 | A1* | 6/2018 | Braskich | H04N 21/2343 |

* cited by examiner

*Primary Examiner* — Joon Kwon
(74) *Attorney, Agent, or Firm* — BakerHostetler

(57) ABSTRACT

An input video stream of video content may be encoded and transmitted from a provider to an intermediary, which decodes and edits the video content, and then re-encodes and transmits the video content to end viewers via an output video stream. When re-encoding the video content, the intermediary may determine to selectively re-use and/or not re-use input motion vectors from the input video stream, for example based on an amount of distortion associated with editing of the video content. In some examples, input motion vectors may be re-used for re-encoding of certain portions (e.g., frames, parts of frames, etc.) of the output video stream and not re-used for re-encoding of other portions of the output video stream.

20 Claims, 8 Drawing Sheets

DISTORTION-BASED VIDEO RE-ENCODING

BACKGROUND

Video content may commonly be delivered from a provider to one or more end viewers over one or more communications networks, such as the Internet. To allow the video content to be delivered in a reliable and efficient manner that does not consume excessive network bandwidth, the video content may typically be encoded for delivery to the end viewers. In some examples, it may be desirable for an intermediary to receive and edit the video content from the provider before it is delivered to the end viewers. In one specific example, an intermediary may receive the video content from the provider, perform various recognition (e.g., facial detection, facial recognition, etc.) operations on the video content, edit the video content, and then deliver the edited video content to the end viewers. For example, the intermediary may detect human faces within various frames of the video content and draw bounding boxes around the detected human faces. In these and other examples, the intermediary may receive encoded input video content from the provider, decode the input video content, edit the input video content to form output video content, re-encode the output video content, and then transmit the re-encoded output video content to the end viewers.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
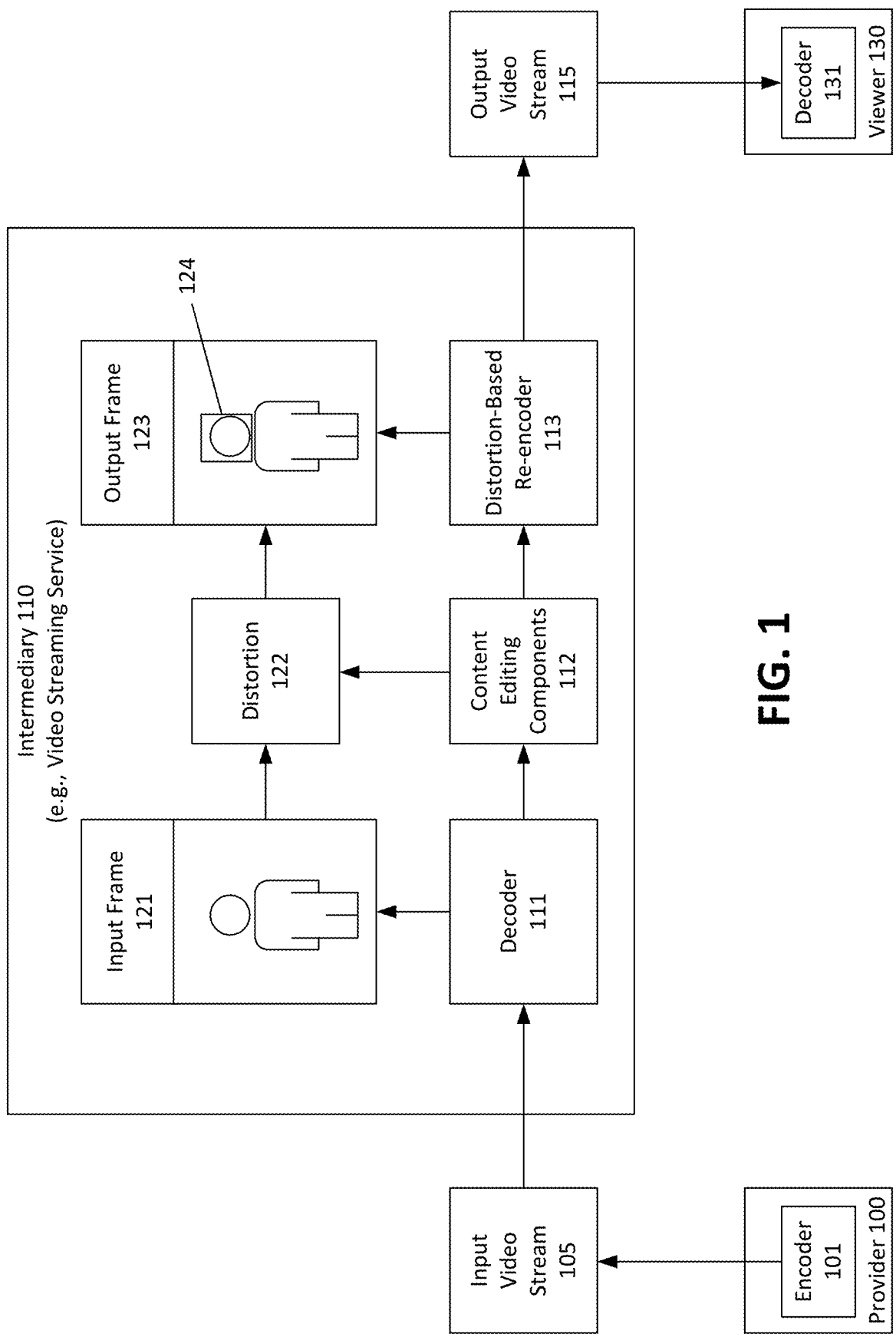
FIG. 1 is a diagram illustrating an example distortion-based video re-encoding system that may be used in accordance with the present disclosure.

Various techniques for distortion-based video re-encoding are described herein. In particular, in some examples, video content may be transmitted from a content provider to one or more end viewers via an intermediary, such as a video streaming service. Specifically, input video content may be encoded and transmitted from the content provider to the intermediary as an input video stream. The intermediary may receive the encoded input video content from the provider, decode the input video content, edit the input video content to form output video content, re-encode the output video content, and then transmit the re-encoded output video content to the end viewers as an output video stream. The end viewers may then receive and decode the output video content, and the output video content may be displayed and viewed. The intermediary may edit the input video content by distorting images in the input video content, such as by adding, deleting, and/or modifying graphics. In one specific example, the intermediary may perform various recognition (e.g., facial detection, facial recognition, etc.) operations on the video content. For example, the intermediary may detect human faces within various frames of the video content and distort the video content by draw bounding boxes around the detected human faces. It is noted, however, that the disclosed techniques are not limited to facial recognition and/or bounding box video editing and that the disclosed techniques may apply to scenarios in which the intermediary distorts the video content in a wide variety of manners for a wide variety of purposes. For example, the intermediary may add, delete and/or modify a wide variety different types of graphics in the video content. In some examples, the intermediary may identify, obscure and/or replace different detected features of the video content (e.g., faces, eyes, noses, other facial features, other body parts, cars, weapons, sporting equipment, elements of nature, etc.), and perform many other types of editing operations. Also, in some examples, the video editing operations may include operations that enhance or adjust video quality, such as by smoothing, sharpening or increasing contrast of images.

In some examples, it may be desirable for the end viewers to receive and view the transmitted video content with only small amounts of latency between the time that video content is originally captured and the time that the video content is displayed to the end viewers. For example, in some cases, the video content may include video of an event, such as a video game, a sports event, a news event, an entertainment event, or other event. A technique known as live streaming refers to scenarios in which video of an event is transmitted and displayed to viewers while subsequent portions of the event are still occurring. In live streaming applications, it is desirable to present video with small amounts of latency, for example so that viewers do not become aware of occurrences within the event (e.g., scoring a touchdown in football, hitting a homerun in baseball, etc.) before video of those occurrences is displayed to the viewers. The ability to present video with only small amounts of latency between its capture and its display may often be referred to as real-time or near-real-time video presentation.

In many cases, however, the editing of video content by an intermediary may introduce substantial amounts of latency into the video processing and delivery pipeline, for example such that real-time or near real-time presentation of the video content may become difficult to achieve. There are typically two types of latency that may be introduced by an intermediary service that performs video editing operations. The first type of latency, referred to hereinafter as video processing latency, relates to the time required to process and edit the input video content to generate the output video content. For example, for the facial detection and bounding box examples described above, the video processing latency may include the time required to perform facial detection/recognition operations on the incoming video content to detect a portion of an image that includes a human face (e.g.

by applying computer vision/machine learning algorithms, etc.)—and the time required to generate and insert a bounding box graphic that surrounds the detected human face. The second type of latency introduced by a video editing intermediary, referred to hereinafter as video encoding latency, relates to the time required to re-encode the output video content after it has been edited for transmission to the end viewers.

In some examples, the techniques described herein may be employed to assist in reducing the video encoding latency described above, such as to enable closer to real-time video presentation or to otherwise reduce latency associated with video presentation to end viewers. In particular, in many cases, the primary contributor to video encoding latency is the motion estimation phase of the video re-encoding process. Specifically, motion estimation is a technique used in encoding processes whereby a particular block of a frame is matched to a particular block of the same or another frame (referred to as a reference block) of the video content that is being encoded. The matched blocks will typically yield minimum differences and often include images of the same or similar object or object portion (e.g., face, eyes, etc.). However, because objects that are depicted within the video content often move and change locations from one frame to the next, the matched blocks will often not be located at the same locations within each frame. The process of motion estimation may therefore include matching of blocks and generation of motion vectors, which are vectors that describe the motion of matching blocks between a current frame and a reference frame. By matching of blocks and generation of motion vectors, the complexity and amount of data that needs to be transmitted within the video stream may be substantially reduced.

Some conventional transcoding processes may perform re-encoding of video content by re-using input motion vectors that were used to encode the input video content that is received and decoded by the intermediary. By re-using the input motion vectors from the input video content, the time required to perform motion estimation and to re-encode the output video content may be substantially reduced, such as compared to scenarios where blocks are re-matched and input vectors are re-calculated during re-encoding of the video content. However, the re-using of input motion vectors is typically advantageous primarily in scenarios where the content of the video is not actually being edited by the intermediary, and the intermediary is instead merely changing the format or technical characteristics (e.g., resolution, bitrate, codec, etc.) of the video. By contrast, in scenarios where the intermediary is actually editing the content of the video (e.g., adding or changing graphics within the video), the re-use of the input motion vectors may lead to undesirable compression ratios or other problems with the re-encoding process. This is because, in these scenarios, the actual content of the video has changed as opposed to merely changing the format or technical characteristics of the video. The re-use of motion vectors may be particularly problematic in scenarios where the distortion of the input video content is substantial and there are major differences between the input and the output video content. Thus, for scenarios in which the content of video is edited and distorted by an intermediary, motion vectors are typically not re-used, and the motion estimation process is instead naively repeated (e.g., repeating block matching and motion vector calculation), leading to higher than desired latency for display of the edited video content to the end users.

In the techniques described herein, the intermediary may determine to selectively re-use and/or not re-use input motion vectors from the input video stream, for example based on an amount of distortion associated with editing of the video content. In particular, in some examples, the intermediary may select a threshold amount of distortion that is used to determine whether or not re-use the input motion vectors. The intermediary may then compare a first portion (e.g., frame, part of a frame, etc.) of the input video content to a respective first portion (e.g., frame, part of a frame, etc.) of the output video content. The first portion of the output video content may include the first portion of the input video content with one or more edits applied thereto. Specifically, the intermediary may determine a first amount of distortion associated with the one or more edits to the first portion of the input video content. Upon determining the first amount of distortion, the intermediary may then compare the first amount of distortion to the threshold amount of distortion. Based on this comparison, the intermediary may then determine whether or not to re-use input motion vectors from the input video stream for re-encoding of the first portion of the output video content. In one specific example, the intermediary may determine to re-use the input motion vectors when the first amount of distortion is below (or otherwise includes less distortion than) the threshold amount of distortion, while the intermediary may determine to not re-use the input motion vectors when the first amount of distortion meets or exceeds (or otherwise includes the same or more distortion than) the threshold amount of distortion. In some examples, the first amount of distortion may be determined based at least in part on one or more differences (e.g., graphics that are added, deleted, modified, etc.) between the first portion of the input video content and the first portion of the output video content. Additionally, in some examples, the first amount of distortion may be determined based at least in part on one or more differences (e.g., graphics that are added, deleted, modified, etc.) between a reference portion of the output video content and the first portion of the output video content.

These distortion-based re-encoding techniques may provide a number of advantages. In particular, the techniques may allow motion vectors to be re-used for re-encoding of certain portions of the video content with no or lesser amounts of distortion, while also allowing motion vectors to not be re-used for re-encoding of other portions of the video content with higher amounts of distortion. For example, in some cases, motion vectors may be re-used for re-encoding of certain video frames with no or lesser amounts of distortion, while also allowing motion vectors to not be re-used for re-encoding of other video frames with higher amounts of distortion. Also, in some examples, motion vectors may be re-used for re-encoding of certain parts (e.g., blocks) of a video frame with no or lesser amounts of distortion, while also allowing motion vectors to not be re-used for re-encoding of other parts (e.g., blocks) of the same video frame with higher amounts of distortion. This is in contrast to certain conventional techniques, for example in which motion vectors may be re-used to re-encode an entire video stream, such as when only the technical formatting (and not the contents) of the video stream are changed. In some examples, by selectively re-using motion vectors for only certain portions of video content (and not for other portions) the time required to perform re-encoding of the video content may be substantially reduced, while also avoiding undesirable compression ratios and other problems, thereby reducing the video encoding latency and potentially allowing closer to real-time video presentation.

FIG. 1 is a diagram illustrating an example distortion-based video re-encoding system that may be used in accordance with the present disclosure. In particular, as shown in FIG. 1, video content may be transmitted from a provider 100 to a viewer 130 through an intermediary 110 via input video stream 105 and output video stream 115. Specifically, input video stream 105 may be encoded by an encoder 101 and transmitted from provider 100 to intermediary 110. Upon receipt by intermediary 110, the input video stream 105 may be decoded by a decoder 111. Content editing components 112 may then edit the input video stream 105, such as by introducing distortion 122 to one or more frames of the input video stream 105. The video content with the distortion 122 applied thereto may be then re-encoded by distortion based re-encoder 113 as output video stream 115. The output video stream 115 may then be transmitted from intermediary 110 to viewer 130. Upon receipt by viewer 130, the output video stream 115 may be decoded by decoder 131 and displayed, such as via a video player application.

The input video stream 105 and output video stream 115 may be transmitted over one or more communications networks, for example including one or more local area networks (LANs) and/or one or more wide area networks (WANs), such as the Internet. The input video stream 105 and output video stream 115 may also be transmitted using streaming video transmission techniques, in which portions of content may be received and presented while subsequent portions of the content are still being transmitted. In some examples, input video stream 105 and output video stream 115 may include video of an event, such as a video game, a sports event, a news event, an entertainment event, or other event. Also, in some examples, video content included in input video stream 105 and output video stream 115 may be presented using live streaming, in which video of an event is transmitted and displayed to a viewer while subsequent portions of the event are still occurring.

The intermediary 110 may edit the input video stream 105 by introducing distortion 122 to one or more frames of the input video stream 105, such as by adding, deleting, and/or modifying graphics. In one specific example, the intermediary 110 may perform various recognition (e.g., facial detection, facial recognition, etc.) operations on the video content. For example, the intermediary may detect human faces within various frames of the video content and distort the video content by draw bounding boxes around the detected human faces. FIG. 1 depicts a specific example in which an input frame 121 of the input video stream 105 includes an image of a human. In this example, content editing components 112 may detect a human face, such as by using facial detection and/or facial recognition techniques, and draw a bounding box 124 around the detected human face. Thus, in this example, the distortion 122 introduced by content editing components includes the bounding box 124, which is included in output frame 123. It is noted, however, that the disclosed techniques are not limited to facial recognition and/or bounding box video editing and that the disclosed techniques may apply to scenarios in which the intermediary 110 distorts the video content in a wide variety of manners for a wide variety of purposes. For example, the intermediary 110 may add, delete and/or modify a wide variety different types of graphics in the video content. In some examples, the intermediary 110 may identify, obscure and/or replace different detected features of the video content (e.g., faces, eyes, noses, other facial features, other body parts, cars, weapons, sporting equipment, elements of nature, etc.), and perform many other types of editing operations. Also, in some examples, the video editing operations may include operations that enhance or adjust video quality, such as by smoothing, sharpening or increasing contrast of images.

As set forth above, in some examples, the intermediary 110 may determine to selectively re-use and/or not re-use input motion vectors from the input video content, for example based on an amount of distortion introduced by editing of the video content. In particular, in some examples, the intermediary 110 may select a threshold amount of distortion that is used to determine whether or not re-use the input motion vectors. The intermediary 110 may then compare a first portion (e.g., frame, part of a frame, etc.) of the input video content to a respective first portion (e.g., frame, part of a frame, etc.) of the output video content. The first portion of the output video content may include the first portion of the input video content with one or more edits applied thereto. Specifically, the intermediary 110 may determine a first amount of distortion of the first portion of the input video content that results in the first portion of the output video content. Upon determining the first amount of distortion, the intermediary 110 may then compare the first amount of distortion to the threshold amount of distortion. Based on this comparison, the intermediary 110 may then determine whether or not to re-use input motion vectors for re-encoding of the first portion of the output video content.

Figure 2:
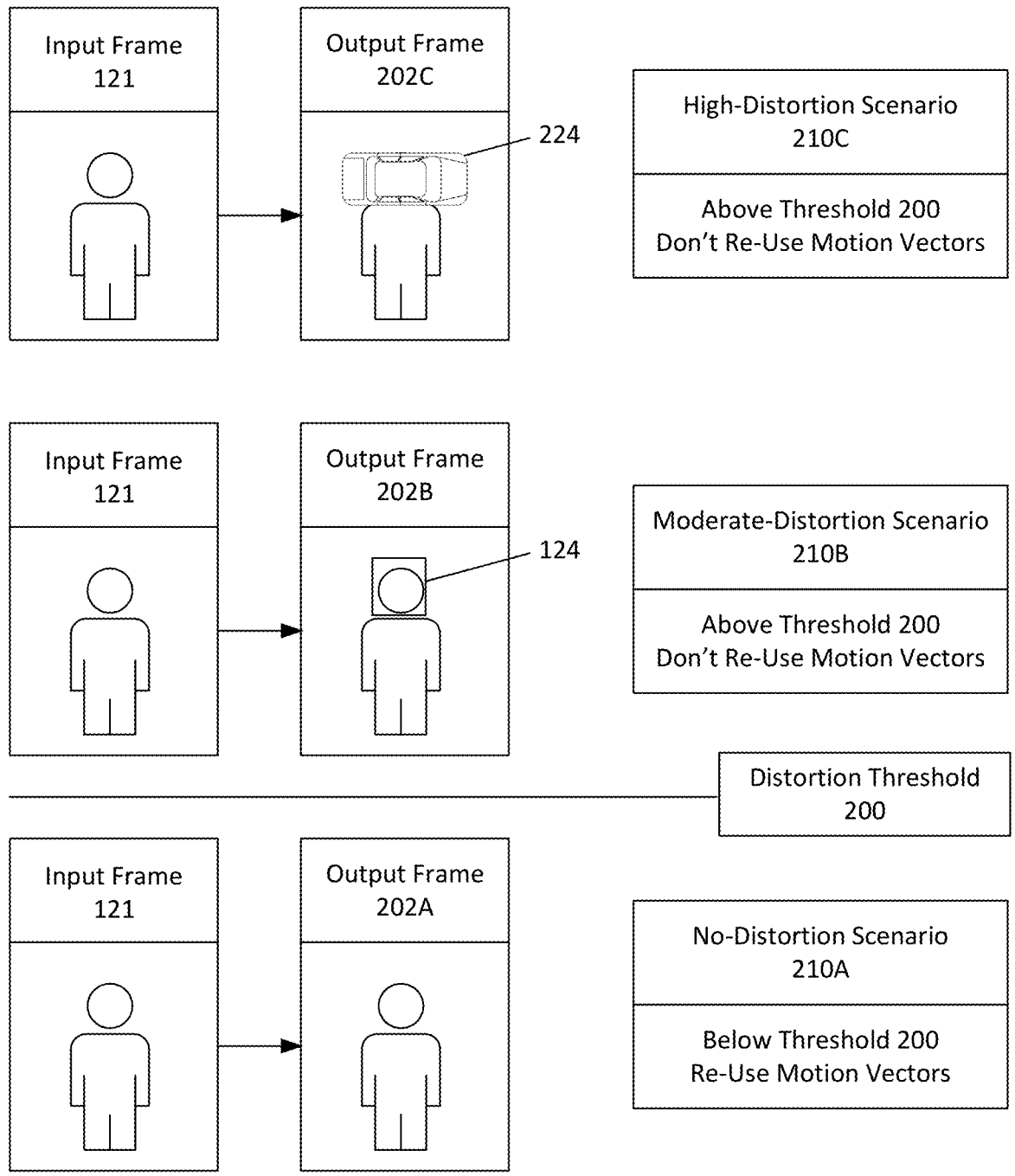
FIG. 2 is a diagram illustrating an example lower video distortion threshold that may be used in accordance with the present disclosure.
Figure 3:
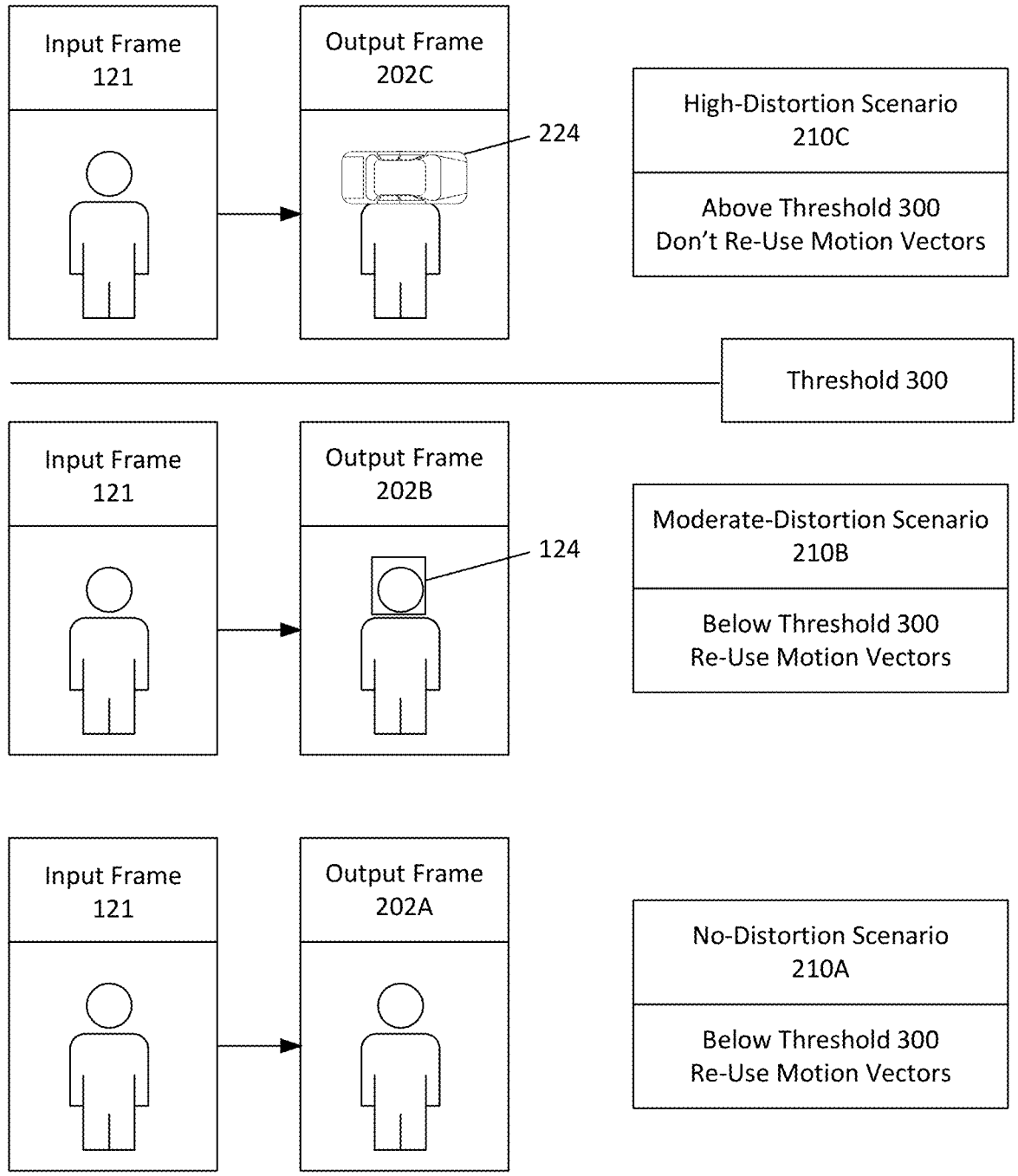
FIG. 3 is a diagram illustrating an example higher video distortion threshold that may be used in accordance with the present disclosure.

Referring now to FIGS. 2 and 3, some example video distortion thresholds will now be described in detail. In particular, FIG. 2 depicts three example scenarios 210A-C in which input frame 121, which is an image of a human, may be compared to respective output frames 202A-C, for example by distortion-based re-encoder 113. As a first example, in no-distortion scenario 210A, which is depicted in the bottom portion of FIG. 2, input frame 121 may be compared to a respective output frame 202A. In no-distortion scenario 210A, output frame 202A is identical to input frame 121, and, therefore, there is no distortion of input frame 121 to result in output frame 202A. As a second example, in moderate-distortion scenario 210B, which is depicted in the middle portion of FIG. 2, input frame 121 may be compared to a respective output frame 202B. In moderate-distortion scenario 210B, output frame 202B is identical to input frame 121, with the exception that a bounding box 124 is drawn around the human's face. In this example, the drawing of bounding box 124 is considered to be moderate distortion of input frame 121 to result in output frame 202B. As a third example, in high-distortion scenario 210C, which is depicted in the top portion of FIG. 2, input frame 121 may be compared to a respective output frame 202C. In high-distortion scenario 210C, output frame 202C is identical to input frame 121, with the exception that the human's face is replaced by an image of a car 224. In this example, the drawing of the car 224 to replace the human's face is considered to be high distortion of input frame 121 to result in output frame 202C.

In the example of FIG. 2, a distortion threshold 200 is set for determining whether or not to re-use motion vectors for re-encoding. In this particular example, the distortion threshold 200 is an amount of distortion that is lower than the moderate amount of distortion of input frame 121 in moderate-distortion scenario 220B but higher than the zero amount of distortion in no-distortion scenario 220A. Accordingly, in the example of FIG. 2, no-distortion scenario 210A is below the distortion threshold 200, and motion vectors are therefore re-used for the re-encoding of output frame 202A. By contrast, in the example of FIG. 2, moderate-distortion scenario 210B and high-distortion scenario 210C are both above the distortion threshold 200, and motion vectors are therefore not re-used for the re-encoding of output frames 202B or 202C.

Referring now to FIG. 3, a second example is shown in which the distortion threshold 200 of FIG. 2 is replaced by a different distortion threshold 300. In particular, FIG. 3 includes the same three distortion scenarios 210A-C as were included in FIG. 2. However, in the example of FIG. 3, distortion threshold 300 is a higher amount of distortion than distortion threshold 200. Thus, in the example of FIG. 3, moderate-distortion scenario 210B is now below distortion threshold 300 (as opposed to being above distortion threshold 200). Thus, in the example of FIG. 3, both no-distortion scenario 210A and moderate-distortion scenario 220B are below the distortion threshold 300, and motion vectors are therefore re-used for the re-encoding of output frames 202A and 202B. By contrast, in the example of FIG. 3, high-distortion scenario 210C remains above the distortion threshold 300, and motion vectors are therefore not re-used for the re-encoding of output frame 202C.

Thus, FIGS. 2 and 3 show examples of how selection and use of different distortion thresholds may affect the re-encoding of video content. In particular, in some examples, selection of a lower distortion threshold (e.g., distortion threshold 200) may more substantially reduce latency (e.g., by more frequently re-using motion vectors) but may sometimes have a less optimal compression ratio. By contrast, in some examples, selection of a higher distortion threshold (e.g., distortion threshold 300) may less substantially reduce latency (e.g., by less frequently re-using motion vectors) but may sometimes achieve a more optimal compression ratio. In some examples, the value of a distortion threshold may be determined using a variety of techniques, such as by heuristic values, utilizing machine learning algorithms to yield an optimized value, and/or through any combination of these or other techniques. In some examples, the distortion threshold may be selected based on observed historical data, such as records of various distortion thresholds and related characteristics, such as user satisfaction with various distortion thresholds, latency, errors, and other related characteristics. Additionally, in some examples, the value of the distortion threshold may be changed dynamically during transmission, for example, based on factors such as latency, video quality, and others. Moreover, in some examples, different distortion thresholds may be selected and applied to different frames and/or to different parts of the same frame. For example, in some cases, a lower distortion threshold may be applied to areas adjacent to a center or foreground of a frame, while a higher distortion threshold may be applied areas adjacent to edges, corners or background of a frame.

In some examples, the distortion threshold may include an amount of one or more distortion measures, such as a percentage or other amount of changed pixels, a value of peak signal-to-noise ratio (PSNR), and/or any combination of these or other measures. In one specific example, the distortion threshold may include a threshold percentage of pixel color values that may change within an output frame relative to a respective input frame. For example, a percentage of pixel color values that change in an output frame (e.g., one of output frames 202A-C) relative a respective input frame (e.g., input frame 121) may be determined. The determined percentage of changed pixel color values may then be compared to the threshold percentage of pixel color values. In some examples, if the determined percentage of changed pixel color values is below the threshold percentage of changed pixel color values, then the input video stream motion vectors may be re-used. By contrast, in some examples, if the determined percentage of changed pixel color values meets or exceeds the threshold percentage of changed pixel color values, then the input video stream motion vectors may not be re-used. In some cases, this analysis may be performed on an entire frame or may be performed individually on one or more different parts of the same frame.

In another specific example, the distortion threshold may include a threshold PSNR that measures distortion of an input frame that results in a respective output frame. For example, a PSNR of an output frame (e.g., one of output frames 202A-C) relative a respective input frame (e.g., input frame 121) may be determined. The determined PSNR may then be compared to the threshold PSNR. In some examples, if the determined PSNR is above the threshold PSNR, then the input video stream motion vectors may be re-used (because higher PSNR's indicate less distortion than lower PSNR's). By contrast, in some examples, if the determined PSNR is at or below the threshold PSNR, then the input video stream motion vectors may not be re-used (because lower PSNR's indicate more distortion than higher PSNR's).

As described above with reference to FIGS. 2 and 3, the first amount of distortion associated with edits to a first portion of input video content may, in some examples, be determined based at least in part on one or more differences between the first portion of input video content and a first portion of output video content. For example, as shown in FIGS. 2 and 3, when a human face is changed to a car, this may be considered to be a high amount of distortion because of the substantial differences between the first portion of the input video content (e.g., the human face) and the first portion of the output video content (e.g., the car). It is noted however, that the techniques described herein are not limited to determining the first amount of distortion solely based on differences between a first portion of input video content and a first portion of output video content. In particular, in some examples, the first amount of distortion associated with edits to the first portion of input video content may be determined based at least in part on one or more differences between a reference portion of output video content and the first portion of output video content. For example, consider the scenario in which a human face appears in both a current input frame and a reference input frame that serves as a reference for determining an input motion vector for the human face. Now suppose that the human face is changed to a car in both a current output frame (that corresponds to the current input frame) and in a reference output frame (that corresponds to the reference input frame). In this example, although the differences between the content of the input frames (e.g., human face) and the output frames (e.g., car) are high, the edits are consistent across the two output frames (e.g. they both include a car that replaces a face). In this scenario, the input motion vector may be used to represent the motion of the human face from the reference input frame to the current input frame. Also, in this scenario, because the changes in the output video are consistent, the same input motion vector may also be usable to represent the motion of the car from the reference output frame to the current output frame. Thus, in this example, even though the amount differences between the current input frame and the current output frame may be high (e.g., human face changed to car), the first amount of distortion may be determined to be low because the amount of differences between the reference output frame and the current output frame (e.g., they both include the same car that replaces the face) may be determined to be zero or low.

Figure 4:
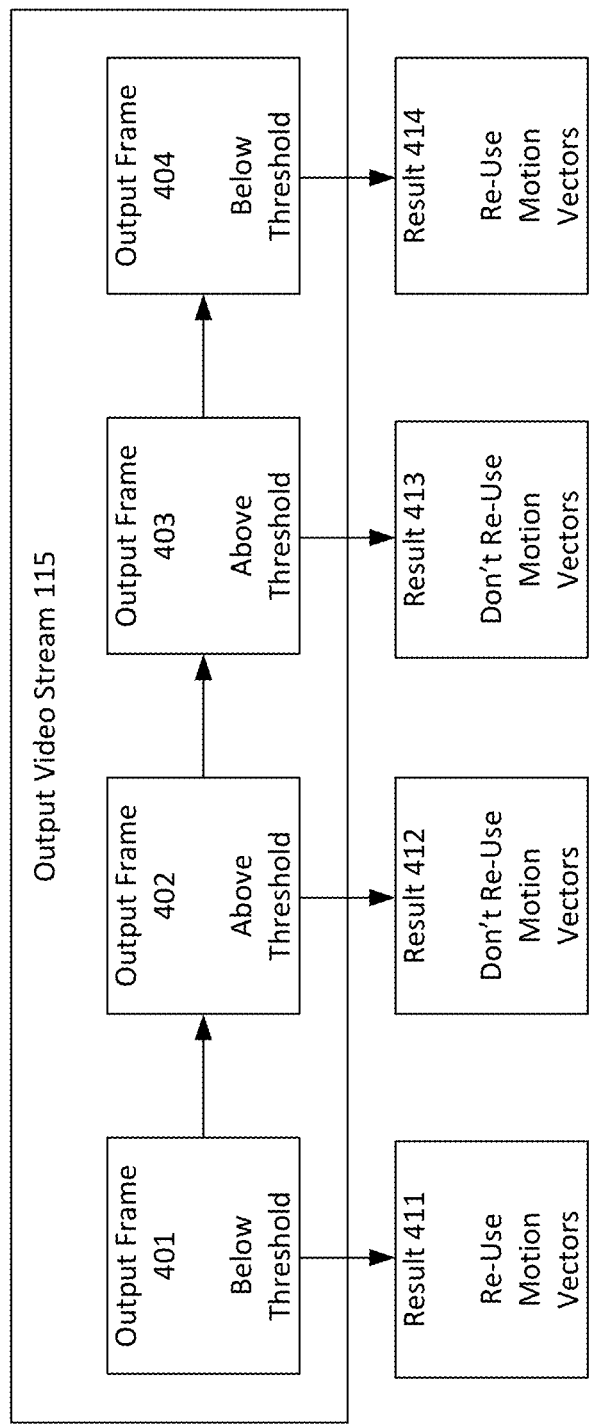
FIG. 4 is a diagram illustrating example distortion-based re-encoding at whole frame-level granularity that may be used in accordance with the present disclosure.

It is noted that, during the course of a particular transmission, some output frames within the output video stream 115 may be determined to be below the distortion threshold, while other output frames may be determined to be above the distortion threshold. Thus, the input video stream motion vectors may be re-used for re-encoding of some output frames with no or lesser distortion, but may not be re-used for re-encoding of other output frames with greater distortion. As set forth above, in some examples, by selectively re-using motion vectors for only certain portions of video content (and not for other portions) the time required to perform re-encoding of the video content may be substantially reduced, while also avoiding undesirable compression rations and other problems, thereby reducing the video encoding latency and potentially allowing closer to real-time video presentation. Referring now to FIG. 4, an example of distortion-based re-encoding at whole frame-level granularity will now be described in detail. In particular, as shown in FIG. 4, output video stream 115 may include four example output frames 401-404 that are encoded successively starting with output frame 401 and ending with output frame 404. In this example, output frames 401 and 404 are determined to be below the distortion threshold while output frames 402 and 403 are determined to be above the distortion threshold. Accordingly, in this example, as indicated in results 411 and 414, determinations are made to re-use the respective input stream motion vectors for re-encoding of output frames 401 and 404. By contrast, in this example, as indicated in results 412 and 413, determinations are made to not re-use the respective input stream motion vectors for re-encoding of output frames 402 and 403.

Thus, FIG. 4 depicts an example in which a determination is made on a frame-by-frame basis as to whether or not to re-use input video stream motion vectors for re-encoding of the output video stream. It is noted, however, that there is no requirement that such determinations be made on a frame-by-frame basis, and that these types of determinations may be made at other levels of granularity, such as to groups of frames and/or to different parts of the same frame. For example, in some cases, a determination may be made to re-use input stream motion vectors for re-encoding for one part of a frame, while not to re-use input stream motion vectors for re-encoding of another part of the same frame. For these determinations, the amount of distortion in a specific part of a frame may be determined and compared to a distortion threshold for that portion of the frame.

Figure 5:
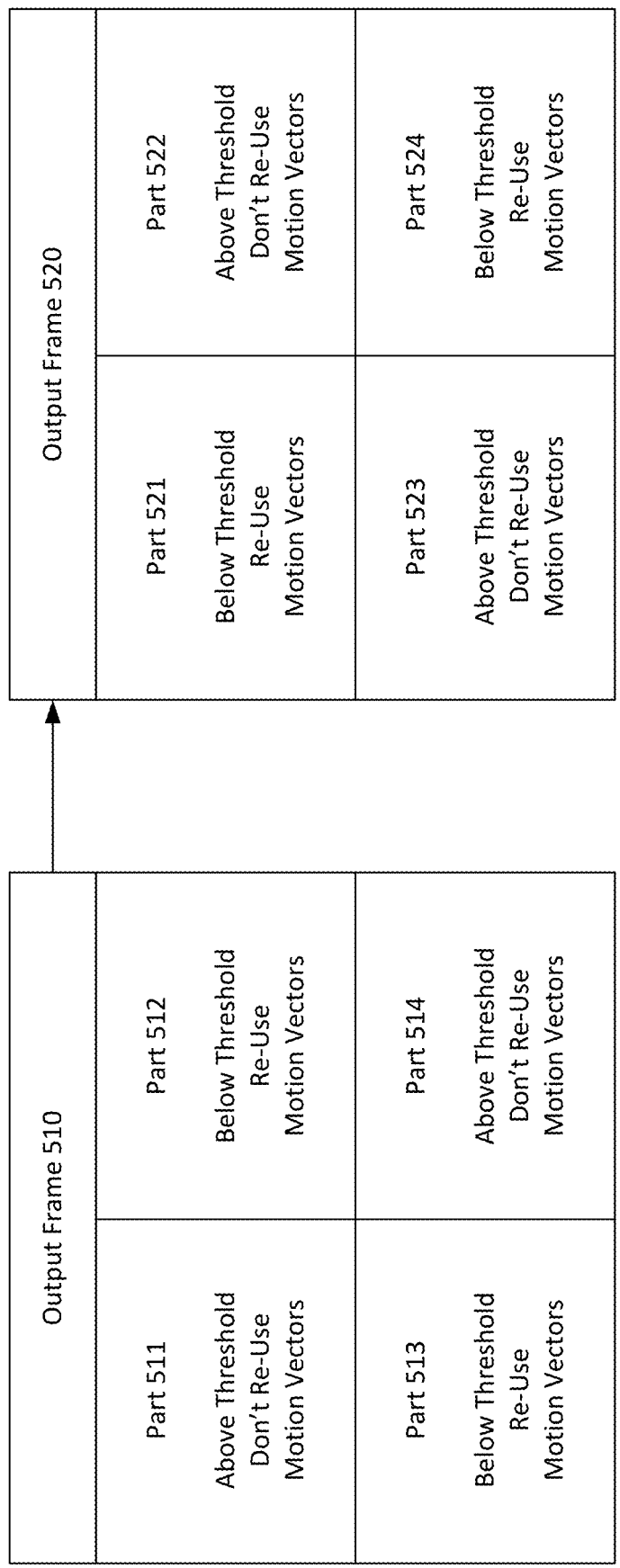
FIG. 5 is a diagram illustrating example distortion-based re-encoding at frame part-level granularity that may be used in accordance with the present disclosure.

Referring now to FIG. 5, an example of distortion-based re-encoding at frame part-level granularity will now be described in detail. In particular, as shown in FIG. 4, two example output frames 510 and 520 are shown. Specifically, output frame 510 includes four parts 511-514, while output frame 520 includes four parts 521-524. In this example, for output frame 510, parts 512 and 513 are determined to be below the distortion threshold while parts 511 and 514 are determined to be above the distortion threshold. Accordingly, in this example, determinations are made to re-use the respective input stream motion vectors for re-encoding of parts 512 and 513. By contrast, in this example, determinations are made to not re-use the respective input stream motion vectors for re-encoding of parts 511 and 514. Additionally, for output frame 520, parts 521 and 524 are determined to be below the distortion threshold while parts 522 and 523 are determined to be above the distortion threshold. Accordingly, in this example, determinations are made to re-use the respective input stream motion vectors for re-encoding of parts 521 and 524. By contrast, in this example, determinations are made to not re-use the respective input stream motion vectors for re-encoding of parts 522 and 523. It is noted that, in some examples, the determinations of whether or not to re-use motion vectors for a particular frame area may change throughout the course of transmission. For example, in the case of FIG. 5, the top-left part 511 of frame 510 is above the threshold and motion vectors are not re-used for re-encoding of part 511. By contrast, the top-left part 521 of frame 520 is below the threshold and motion vectors are re-used for re-encoding of part 521. As another example, the top-right part 512 of frame 510 is below the threshold and motion vectors are re-used for re-encoding of part 512. By contrast, the top-right part 522 of frame 520 is above the threshold and motion vectors are not re-used for re-encoding of part 522.

Figure 6:
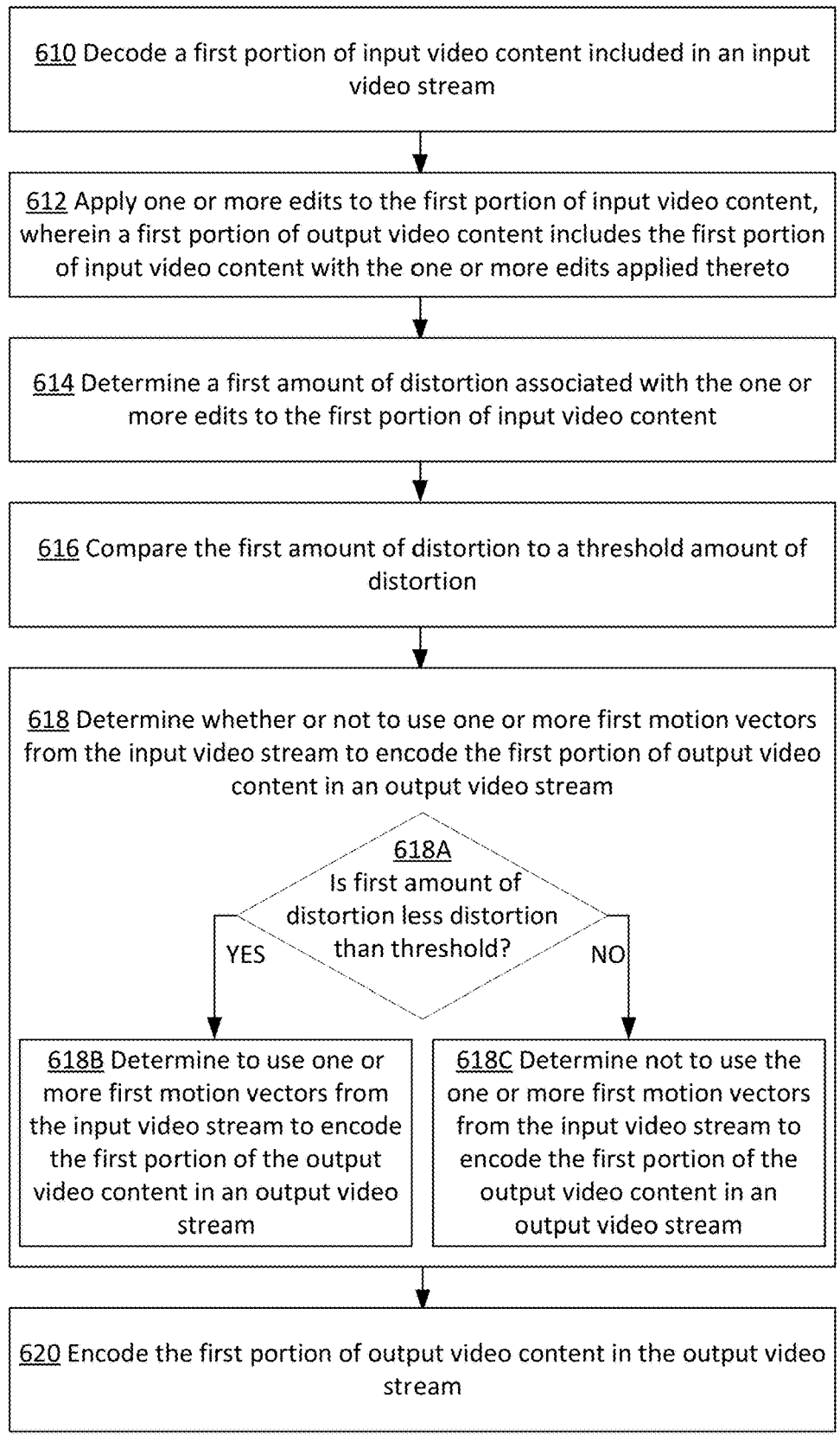
FIG. 6 is a flowchart illustrating an example process for distortion-based video processing that may be used in accordance with the present disclosure.

FIG. 6 is a flowchart illustrating an example process for distortion-based video processing that may be used in accordance with the present disclosure. The process of FIG. 6 is initiated at operation 610, at which a first portion of input video content included in an input video stream is decoded. As set forth above, in some examples, the input video stream may be encoded by a provider, and the encoded input video stream may be transmitted from the provider to an intermediary, such as a video streaming service, over one or more communications networks. Upon receipt by the intermediary, the input video stream may be decoded, such as to enable various content editing operations to be performed on the input video content. In some examples, the first portion of the input video content may include a video frame or a group of video frames. Also, in some examples, the first portion of the input video content may be only a less than whole part of a video frame.

At operation 612, one or more edits are applied to the first portion of input video content. A first portion of output video content may include the first portion of input video content with the one or more edits applied thereto. The edits applied at operation 612 may not merely be changes to the technical format (e.g., resolution, bitrate, codec, etc.) of the first portion of the input video content, but may instead include changes to the contents (e.g., graphics, pixel color values, etc.) of the first portion of the input video stream. As set forth above, the intermediary may edit the input video content by distorting images in the input video content, such as by adding, deleting, and/or modifying graphics. In one specific example, distortion of the first portion of input video content may include an indication of a result of a facial recognition process. For example, the intermediary may perform a facial recognition process on the first portion of input video content. In particular, the intermediary may detect a human face within first portion of input video content and draw a bounding box around the detected human face. It is noted, however, that the disclosed techniques are not limited to facial recognition and/or bounding box video editing and that the disclosed techniques may apply to scenarios in which the intermediary distorts the video content in a wide variety of manners for a wide variety of purposes. For example, the intermediary may add, delete and/or modify a wide variety different types of graphics in the video content. In some examples, the intermediary may identify, obscure and/or replace different detected features of the video content (e.g., faces, eyes, noses, other facial features, other body parts, cars, weapons, sporting equipment, elements of nature, etc.), and perform many other types of editing operations. Also, in some examples, the video editing operations may include operations that enhance or adjust video quality, such as by smoothing, sharpening or increasing contrast of images.

At operation 614, a first amount of distortion associated with the one or more edits to the first portion of input video content is determined. In some examples, the first amount of distortion may be determined based at least in part on one or more differences (e.g., graphics that are added, deleted, modified, etc.) between the first portion of the input video content and the first portion of the output video content. For example, in some cases, the first amount of distortion may be determined by comparing the first portion of input video content to the first portion of output video content and determining an amount of the differences between them. In some examples, the first amount of distortion may include a calculated amount (e.g., a percentage, a total/cumulative quantity, etc.) of pixels in the first portion of the input video content whose color values change when compared to corresponding pixels at respective locations (e.g., coordinate values) in the first portion of the output video content. In some examples, the first amount of distortion may include an amount of change in brightness, chrominance and/or luminance from the first portion of input video content to the first portion of output video content. Also, in some examples, the first amount of distortion may include a calculated peak signal-to-noise ratio (PSNR) amount that is determined by comparing the first portion of input video content to the first portion of output video content. Additionally, in some examples, the first amount of distortion may be determined based at least in part on one or more differences (e.g., graphics that are added, deleted, modified, etc.) between a reference portion of the output video content and the first portion of the output video content. For example, in some cases, the first amount of distortion may be determined by comparing a reference portion of output video content to the first portion of output video content and determining an amount of the differences between them. In some examples, the first amount of distortion may include a calculated amount (e.g., a percentage, a total/cumulative quantity, etc.) of pixels in the reference portion of the output video content whose color values change when compared to corresponding pixels at respective locations (e.g., coordinate values) in the first portion of the output video content. In some examples, the first amount of distortion may include an amount of change in brightness, chrominance and/or luminance from the reference portion of output video content to the first portion of output video content. Also, in some examples, the first amount of distortion may include a calculated peak signal-to-noise ratio (PSNR) amount that is determined by comparing the reference portion of output video content to the first portion of output video content.

At operation 616, the first amount of distortion is compared to a threshold amount of distortion. In some examples, the threshold amount of distortion may include a threshold amount (e.g., a percentage, a total/cumulative quantity, etc.) of changed pixel color values. In some examples, the threshold amount of distortion may include a threshold change in brightness, chrominance, and/or luminance. Also, in some examples, the threshold amount of distortion may include a threshold peak signal-to-noise ratio (PSNR) amount. As set forth above, in some examples, the threshold amount of distortion may be set based on factors such as latency reduction, compression ratio, and other factors. As also set forth above, in some examples, the value of a distortion threshold may be determined using a variety of techniques, such as by heuristic values, utilizing machine learning algorithms to yield an optimized value, and/or through any combination of these or other techniques. In some examples, the distortion threshold may be selected based on observed historical data, such as records of various distortion thresholds and related characteristics, such as user satisfaction with various distortion thresholds, latency, errors, and other related characteristics. Additionally, in some examples, the value of the distortion threshold may be changed dynamically during transmission, for example, based on factors such as latency, video quality, and others. Moreover, in some examples, different distortion thresholds may be selected and applied to different frames and/or to different parts of the same frame. For example, in some cases, a lower distortion threshold may be applied to areas adjacent to a center or foreground of a frame, while a higher distortion threshold may be applied areas adjacent to edges, corners or background of a frame.

At operation 618, it is determined whether or not to use one or more first motion vectors from the input video stream to encode the first portion of output video content in an output video stream. In some examples, operation 618 may be performed after initiation of transmission of the input video stream, for example as opposed to being performed in advance of transmission of the input video stream. Operation 618 may be performed based at least in part on the comparison performed at operation 616, such as based on whether the first amount of distortion is more, less or the same amount of distortion as the threshold amount of distortion. For example, in some cases, operation 618 may include sub-operations 618A-C. In particular, at operation 618A, it may be determined whether the first amount of distortion is less distortion than the threshold amount of distortion. If the first amount of distortion is less distortion than the threshold amount of distortion, then, at sub-operation 618B, it is determined to use the one or more first motion vectors from the input video stream to encode the first portion of output video content in the output video stream. For example, in some cases, if the first amount of distortion includes a lower percentage of changed pixel color values and/or a higher PSNR than the threshold, then the one or more first motion vectors from the input video stream may be used to encode the first portion of output video content in the output video stream. If the first amount of distortion is not less distortion (i.e., is the same or greater distortion) than the threshold amount of distortion, then, at sub-operation 618C, it is determined not to use the one or more first motion vectors from the input video stream to encode the first portion of output video content in the output video stream. For example, in some cases, if the first amount of distortion includes a same or higher percentage of changed pixel color values and/or a same or lower PSNR than the threshold, then the one or more first motion vectors from the input video stream may not be used to encode the first portion of output video content in the output video stream.

At operation 620, the first portion of output video content in the output video stream is encoded. Depending upon the determination made at operation 618, the first portion of the output video content may be encoded either using the one or more first motion vectors from the input video stream (e.g., sub-operation 618B) or not using the one or more first motion vectors from the input video stream (e.g., sub-operation 618C). As set forth above, in some examples, the output video stream may be encoded by the intermediary, and the encoded output video stream may be transmitted from the intermediary to an end viewer. The end viewer's device may then decode and display the output video stream to the end viewer. As also set forth above, in some examples, the both the input video stream and the output video stream may be live video streams. Live video streams may include video of an event in which video of portions of the event are displayed to a viewer while subsequent portions of the event are still occurring.

As set forth above, in some examples, input motion vectors may be re-used for re-encoding of certain portions (e.g., frames, parts of frames, etc.) of the output video stream and not re-used for re-encoding of other portions of the output video stream. For example, in some cases, when the one or more first motion vectors from the input video stream are used to encode the first portion of output video content in the output video stream (e.g., sub-operation 618B), no motion vectors from the input video stream may be used to encode one or more other portions of output video content in the output video stream. Also, in some cases, when the one or more first motion vectors from the input video stream are not used to encode the first portion of output video content in the output video stream (e.g., sub-operation 618C), one or more other motion vectors from the input video stream may be used to encode one or more other portions of output video content in the output video stream. In some examples, by selectively re-using and not re-using motion vectors for different portions of the video content, latency may be reduced while still avoiding undesirable compression ratios and other problems.

In some examples, when a determination is made to use the one or more first motion vectors from the input video stream to encode the first portion of output video content (e.g., at sub-operation 618B), the encoding of the first portion of output video content may be performed with an identical motion vector that was used in the input video stream. It is noted, however, that use and/or re-use of a motion vector, as those phrases are used herein, does not necessarily require that encoding of the first portion of output video content is performed with an exact identical motion vector that was used in the input video stream. Thus, in some examples, when a determination is made to use the one or more first motion vectors from the input video stream to encode the first portion of output video content (e.g., at sub-operation 618B), a motion vector that was used in the input video stream may be modified, and the encoding of the first portion of output video content may be performed with a modified version of the motion vector that was used in the input video stream. For example, in some cases, a motion vector may be modified and then re-used for re-encoding when there is a change in resolution from the input video content to the output video content. In these cases, the motion vector may be modified by, for example, scaling it according to the change of the resolutions. As should be appreciated, however, modifying and using modified versions of motion vectors from the input video stream is different from scenarios in which a determination is made not to use motion vectors from the input video stream (e.g., at sub-operation 618C), such as in scenarios when the motion estimation process (e.g., block matching and motion vector calculation) is naively repeated for re-encoding of the first portion of the output video stream.

Furthermore, in some examples, when an attempt is made to encode an output video frame by re-using a motion vector that points to another frame, it may be determined that the reference area of the other frame has been substantially modified. In this scenario, simply re-using the motion vector may often yield an undesirable compression ratio. In some examples, however, the motion vector may serve as a reference starting point to search other areas adjacent to the reference area for a better compression result. This may still reduce latency, for example as compared to naively repeating the entire block matching and motion estimation process. Thus, in some examples, even when an input motion vector is not itself re-used for re-encoding of the output video stream, it may still be applied as a reference, such as a starting point, to search one or more areas adjacent to a reference area for a different motion vector for use in re-encoding of the output video content.

Additionally, in some examples, in addition or as an alternative to motion vectors, other information from the input video stream may also be re-used to re-encode one or more portions of an output video stream. For example, in some cases, the same processes and criteria described above (e.g., the process of FIG. 6, etc.) that are used to determine whether or not to re-use motion vectors from the input video stream may additionally or alternatively be used to determine whether or not to re-use additional information associated with the input video stream, such as encoding mode determinations (e.g., inter-frame or intra-frame), macroblock size determinations (e.g., 16×16 pixels, 4×4 pixels, etc.), skip macro block determinations (e.g., when a macroblock is very similar to its reference macroblock), and other determinations or information. For example, in some cases, if the first amount of distortion is less distortion than the threshold amount of distortion (e.g., YES branch of sub-operation 618A), then a determination may be made to re-use the same encoding mode (e.g., inter-frame or intra-frame) that was used for the corresponding portion of the input video stream, to reuse the same macroblock size (e.g., 16×16 pixels, 4×4 pixels, etc.) that was used for the corresponding portion of the input video stream, to skip a macroblock if the corresponding macroblock was skipped in the input video stream, and/or to re-use other information from the input video stream. In the inter-frame mode, one or more macroblocks of a frame may refer to one or more macroblocks of a different reference frame. By contrast, in the intra-frame mode, one or more macroblocks of a frame may refer to one or more other macroblocks of the same frame. In some examples, the re-used information is not necessarily limited to the examples described above, and may include any information from the input video stream that would be advantageous to re-use for encoding of the output video stream.

Figure 7:
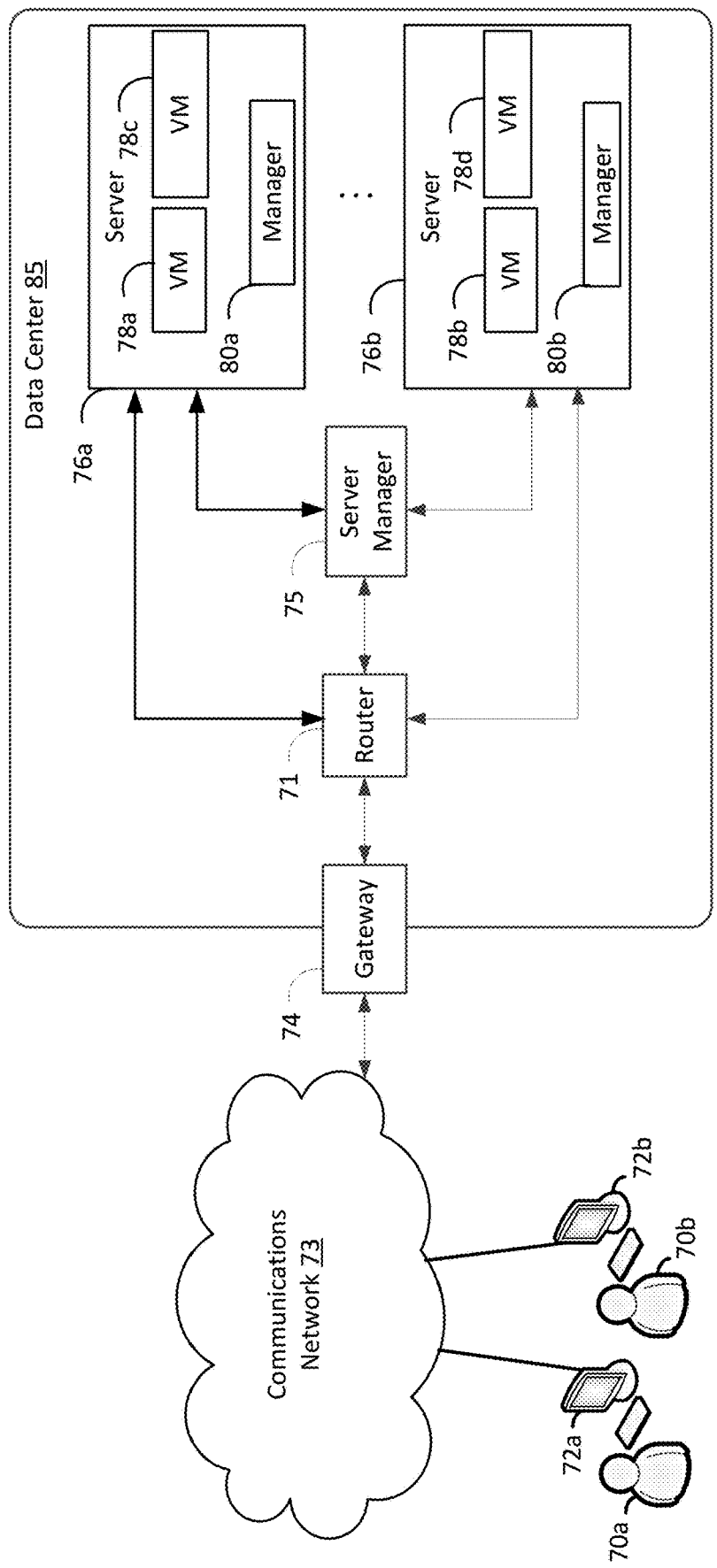
FIG. 7 is a diagram illustrating an example system for transmitting and providing data that may be used in accordance with the present disclosure.

An example system for transmitting and providing data will now be described in detail. In particular, FIG. 7 illustrates an example computing environment in which the embodiments described herein may be implemented. FIG. 7 is a diagram schematically illustrating an example of a data center 85 that can provide computing resources to users 70*a* and 70*b* (which may be referred herein singularly as user 70 or in the plural as users 70) via user computers 72*a* and 72*b* (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 7 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 7, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 7, a server manager 75 is also employed to at least in part direct various communications to, from and/or between servers 76a and 76b. While FIG. 7 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 85 described in FIG. 7 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 8:
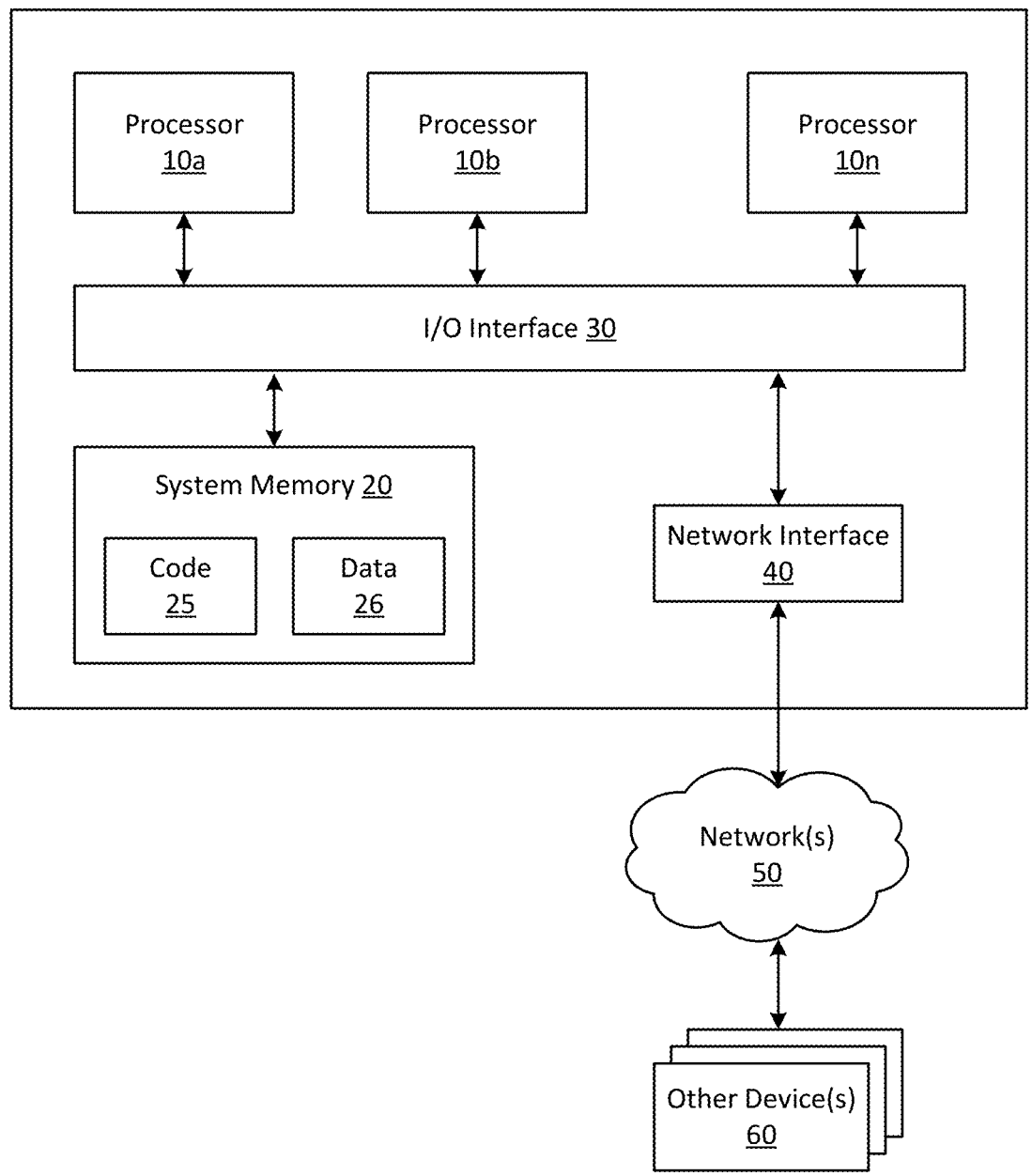
FIG. 8 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 8 depicts a computer system that includes or is configured to access one or more computer-accessible media. In the illustrated embodiment, computing device 15 includes one or more processors 10*a*, 10*b* and/or 10*n* (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state.

The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system for distortion-based video processing in live video streams comprising:
   one or more processors; and
   one or more memories having stored therein instructions that, upon execution by the one or more processors, cause the computing system to perform operations comprising:
      decoding a first portion of input video content included in an input live video stream, wherein one or more edits are applied to the first portion of input video content, wherein a first portion of output video content includes the first portion of input video content with the one or more edits applied thereto;
      determining a first amount of distortion associated with the one or more edits to the first portion of input video content, wherein the first amount of distortion is determined based at least in part on one or more differences between the first portion of input video content and the first portion of output video content;
      comparing the first amount of distortion to a threshold amount of distortion;
      based at least in part on the comparing, determining whether or not to use one or more first motion vectors from the input live video stream to encode the first portion of output video content in an output live video stream; and
      encoding the first portion of output video content in the output live video stream.

2. The computing system of claim 1, wherein the one or more first motion vectors from the input live video stream are used to encode the first portion of output video content in the output live video stream, and wherein no motion vectors from the input live video stream are used to encode one or more other portions of output video content in the output live video stream.

3. The computing system of claim 1, wherein the one or more first motion vectors from the input live video stream are not used to encode the first portion of output video content in the output live video stream, and wherein one or more other motion vectors from the input live video stream are used to encode one or more other portions of output video content in the output live video stream.

4. The computing system of claim 1, wherein the distortion of the first portion of input video content comprises an indication of a result of a facial recognition process.

5. A computer-implemented method for distortion-based video processing comprising:
   decoding a first portion of input video content included in an input video stream, wherein one or more edits are applied to the first portion of input video content, wherein a first portion of output video content includes the first portion of input video content with the one or more edits applied thereto;
   determining a first amount of distortion associated with the one or more edits to the first portion of input video content, wherein the first amount of distortion is determined based at least in part on one or more differences between the first portion of input video content and the first portion of output video content;
   comparing the first amount of distortion to a threshold amount of distortion;

based at least in part on the comparing, determining whether or not to use one or more first motion vectors from the input video stream to encode the first portion of output video content in an output video stream; and
encoding the first portion of output video content in the output video stream.

6. The computer-implemented method of claim 5, wherein the first amount of distortion is determined further based in part on one or more differences between a reference portion of output video content and the first portion of output video content.

7. The computer-implemented method of claim 5, wherein the threshold amount of distortion is a threshold percentage of changed color pixel values.

8. The computer-implemented method of claim 5, wherein the threshold amount of distortion is a threshold peak signal-to-noise ratio (PSNR) amount.

9. The computer-implemented method of claim 5, wherein the first portion of input video content comprises a whole video frame.

10. The computer-implemented method of claim 5, further comprising determining, based at least in part on the comparing, whether or not to use additional information associated with the input video stream to encode the first portion of output video content in the output video stream.

11. The computer-implemented method of claim 10, wherein the additional information comprises at least one of an inter-frame encoding mode, an intra-frame encoding mode, a macroblock size, or a skip macroblock determination.

12. The computer-implemented method of claim 5, wherein the one or more first motion vectors from the input video stream are used to encode the first portion of output video content in the output video stream, and wherein no motion vectors from the input video stream are used to encode one or more other portions of output video content in the output video stream.

13. The computer-implemented method of claim 5, wherein the one or more first motion vectors from the input video stream are not used to encode the first portion of output video content in the output video stream, and wherein one or more other motion vectors from the input video stream are used to encode one or more other portions of output video content in the output video stream.

14. The computer-implemented method of claim 5, wherein, when a determination is made to use the one or more first motion vectors, the encoding of the first portion of output video content is performed with an identical motion vector that was used in the input video stream.

15. The computer-implemented method of claim 5, wherein, when a determination is made to use the one or more first motion vectors, a motion vector that was used in the input video stream is modified, and the encoding of the first portion of output video content is performed with a modified version of the motion vector that was used in the input video stream.

16. The computer-implemented method of claim 5, wherein the one or more first motion vectors are applied as a reference to search for a different motion vector for use in the encoding.

17. One or more non-transitory computer-readable storage media having stored thereon instructions that, upon execution by a computing device, cause the computing device to perform operations comprising:
decoding a first portion of input video content included in an input video stream, wherein one or more edits are applied to the first portion of input video content, wherein a first portion of output video content includes the first portion of input video content with the one or more edits applied thereto;
determining a first amount of distortion associated with the one or more edits to the first portion of input video content, wherein the first amount of distortion is determined based at least in part on one or more differences between the first portion of input video content and the first portion of output video content;
comparing the first amount of distortion to a threshold amount of distortion;
based at least in part on the comparing, determining whether or not to use one or more first motion vectors from the input video stream to encode the first portion of output video content in an output video stream; and
encoding the first portion of output video content in the output video stream.

18. The one or more non-transitory computer-readable storage media of claim 17, wherein the one or more first motion vectors from the input video stream are used to encode the first portion of output video content in the output video stream, and wherein no motion vectors from the input video stream are used to encode one or more other portions of output video content in the output video stream.

19. The one or more non-transitory computer-readable storage media of claim 17, wherein the one or more first motion vectors from the input video stream are not used to encode the first portion of output video content in the output video stream, and wherein one or more other motion vectors from the input video stream are used to encode one or more other portions of output video content in the output video stream.

20. The one or more non-transitory computer-readable storage media of claim 17, wherein the distortion of the first portion of input video content comprises an indication of a result of a facial recognition process.

* * * * *